United States Patent
Zhang et al.

(10) Patent No.: US 12,459,396 B2
(45) Date of Patent: Nov. 4, 2025

(54) BATTERY SWAPPING EQUIPMENT FOR ELECTRIC VEHICLE AND POSITIONING METHOD FOR BATTERY SWAPPING EQUIPMENT

(71) Applicant: AULTON NEW ENERGY AUTOMOTIVE TECHNOLOGY GROUP, Shanghai (CN)

(72) Inventors: Jianping Zhang, Shanghai (CN); Chunhua Huang, Shanghai (CN)

(73) Assignee: AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 881 days.

(21) Appl. No.: 17/609,201

(22) PCT Filed: May 7, 2020

(86) PCT No.: PCT/CN2020/089008
§ 371 (c)(1),
(2) Date: Nov. 5, 2021

(87) PCT Pub. No.: WO2020/224616
PCT Pub. Date: Nov. 12, 2020

(65) Prior Publication Data
US 2022/0203860 A1 Jun. 30, 2022

(30) Foreign Application Priority Data
May 7, 2019 (CN) .......................... 201910375999.0

(51) Int. Cl.
*B60L 53/80* (2019.01)
*B60L 50/60* (2019.01)

(52) U.S. Cl.
CPC ............... *B60L 53/80* (2019.02); *B60L 50/66* (2019.02)

(58) Field of Classification Search
CPC .................................. B60L 53/80; B60L 50/66
(Continued)

(56) References Cited

U.S. PATENT DOCUMENTS

| 2011/0113609 A1* | 5/2011 | Berdelle-Hilge ... H01M 50/249 29/762 |
| 2011/0223459 A1* | 9/2011 | Heichal ............... H01M 50/262 403/33 |

(Continued)

FOREIGN PATENT DOCUMENTS

| CN | 103507783 A | * | 1/2014 |
| CN | 206186768 U | * | 5/2017 |

(Continued)

OTHER PUBLICATIONS

English translation of the Written Opinion of the International Searching Authority dated Aug. 10, 2020 for corresponding International Application No. PCT/CN2020/089008, filed May 7, 2020.
(Continued)

*Primary Examiner* — Donald J Wallace
*Assistant Examiner* — Helen Li
(74) *Attorney, Agent, or Firm* — David D. Brush; Westman, Champlin & Koehler, P.A.

(57) ABSTRACT

Battery swapping equipment for an electric vehicle and a positioning method for battery swapping equipment. The battery swapping equipment includes: an unlocking mechanism configured to unlock a battery pack locked onto a fast swapping bracket of the electric vehicle; an image collection module to collect a first actual image containing the lock base during an unlocking process of the battery pack; a storage module configured to store a first standard image collected by the image collection module when the battery swapping equipment is located in a battery swapping position, the first standard image including the lock base; a
(Continued)

positioning judgement module to judge whether the battery swapping equipment is located in the battery swapping position according to the first actual image and the first standard image; if not, generating a first moving instruction according to a judged result; a moving mechanism to move according to the first moving instruction.

16 Claims, 5 Drawing Sheets

(58) Field of Classification Search
USPC .......................................................... 701/22
See application file for complete search history.

(56) References Cited

U.S. PATENT DOCUMENTS

2018/0201110 A1* 7/2018 Yin ....................... F16B 35/045
2020/0317081 A1 10/2020 Chen et al.

FOREIGN PATENT DOCUMENTS

| CN | 105150820 B | * | 5/2018 | |
|---|---|---|---|---|
| CN | 108128132 A | | 6/2018 | |
| CN | 109501747 A | | 3/2019 | |
| CN | 109532779 A | | 3/2019 | |
| FR | 2989522 A1 | | 10/2013 | |
| JP | 2012008019 A | * | 1/2012 | |
| JP | 2014000935 A | | 1/2014 | |
| KR | 20180046600 A | | 5/2018 | |
| WO | WO-2018210004 A1 | * | 11/2018 | .............. B60L 53/80 |

OTHER PUBLICATIONS

International Search Report dated Jul. 20, 2020 for corresponding International Application No. PCT/CN2020/089008, May 7, 2020.
Written Opinion of the International Searching Authority dated Jul. 20, 2020 for corresponding International Application No. PCT/CN2020/089008, filed May 7, 2020.
Communication pursuant to Rules 164(1) EPC dated Jan. 4, 2023, for corresponding European Application No. 20801649.3.
Notice of Reasons for Refusal dated Oct. 25, 2022 for corresponding Japanese Application No. 2021-564236.
English translation and Office Action dated Sep. 18, 2023, for Korean Application No. 10-2021-7040098.
Notice of Reasons for Refusal dated May 16, 2023, for corresponding Japanese Application No. 2021-564236.

* cited by examiner

BATTERY SWAPPING EQUIPMENT FOR ELECTRIC VEHICLE AND POSITIONING METHOD FOR BATTERY SWAPPING EQUIPMENT

CROSS-REFERENCE TO RELATED APPLICATION

This Application is a Section 371 National Stage Application of International Application No. PCT/CN2020/089008, filed May 7, 2020, the content of which is incorporated herein by reference in its entirety, and published as WO 2020/224616 on Nov. 12, 2020, not in English, which claims priority to Chinese patent application 2019103759990 filed on May 7, 2019, the entire contents of which are incorporated herein by reference.

FIELD

The present disclosure relates to a field of battery swap control, and more particularly, to battery swapping equipment for an electric vehicle and a positioning method for the battery swapping equipment.

BACKGROUND

At present, battery swapping equipment is moved to a designated position after a vehicle is parked in a designated area, and then corrects the position of the vehicle under action of a guide fork to achieve accurate positioning of the battery swapping equipment, and further achieve a normal battery swapping function. Therefore, current positioning mode for the battery swapping equipment cannot achieve closed-loop control, and there is a possibility of a battery swapping failure caused by inaccurate positioning of the battery swapping equipment.

SUMMARY

A technical problem to be solved by the present disclosure is to provide battery swapping equipment for an electric vehicle and a positioning method for the battery swapping equipment, to overcome defects in the prior art that positioning for the battery swapping equipment cannot achieve closed-loop control.

The present disclosure solves the above technical problems through the following technical solutions:

Battery swapping equipment for an electric vehicle, including:
  an unlocking mechanism configured to unlock a battery pack locked onto a fast swapping bracket of the electric vehicle, the fast swapping bracket including a lock base;
  an image collection module configured to collect a first actual image including the lock base during an unlocking process of the battery pack;
  a storage module configured to store a first standard image collected by the image collection module when the battery swapping equipment is located in a battery swapping position, the first standard image including the lock base;
  a positioning judgement module configured to judge whether the battery swapping equipment is located in the battery swapping position according to the first actual image and the first standard image; if not, generating a first moving instruction according to a judged result and sending the first moving instruction to a moving mechanism;
  the moving mechanism configured to move according to the first moving instruction.

Battery swapping equipment for an electric vehicle, including:
  an unlocking mechanism configured to unlock a battery pack locked onto a fast swapping bracket of the electric vehicle, the fast swapping bracket including a lock base, and the fast swapping bracket further including a lock linkage movably connected to the lock base;
  an image collection module configured to collect a second actual image including the lock base and the lock linkage during a locking process of the battery pack;
  a storage module configured to store a second standard image including the lock base and the lock linkage and collected by the image collection module when the battery pack is locked on the fast swapping bracket in place, and the lock base and the lock linkage being located in a standard locking position in the second standard image;
  a locking judgement module configured to judge whether the battery pack is locked on the fast swapping bracket in place according to the second actual image and the second standard image;
  if so, the locking judgement module sending a locking confirmation signal.

A positioning method for battery swapping equipment, the battery swapping equipment including an unlocking mechanism and a moving mechanism, the unlocking mechanism being configured to unlock a battery pack locked onto a fast swapping bracket of an electric vehicle, and the fast swapping bracket including a lock base;
  the positioning method includes:
  collecting a first actual image including the lock base during an unlocking process of the battery pack, and storing a first standard image collected when the battery swapping equipment is located in a battery swapping position, the first standard image including the lock base;
  judging whether the battery swapping equipment is located in the battery swapping position according to the first actual image and the first standard image;
  if not, generating a first moving instruction according to a judged result and sending the first moving instruction to the moving mechanism;
  the moving mechanism moving according to the first moving instruction.

A positioning method for battery swapping equipment, the battery swapping equipment including an unlocking mechanism, the unlocking mechanism being configured to unlock a battery pack locked onto a fast swapping bracket of an electric vehicle, the fast swapping bracket including a lock base, and the fast swapping bracket further including a lock linkage movably connected to the lock base;
  wherein the positioning method includes:
  collecting a second actual image including the lock base and the lock linkage during the locking process of the battery pack, and storing a second standard image including the lock base and the lock linkage and collected when the battery pack is locked on the fast swapping bracket in place, and the lock base and the lock linkage being located in a standard locking position in the second standard image;

judging whether the battery pack is locked on the fast swapping bracket in place according to the second actual image and the second standard image;

if so, sending a locking confirmation signal.

DETAILED DESCRIPTION

The following further illustrates the present disclosure by way of embodiments, but the present disclosure is not limited to the scope of the embodiments.

Embodiment 1

Figure 1:
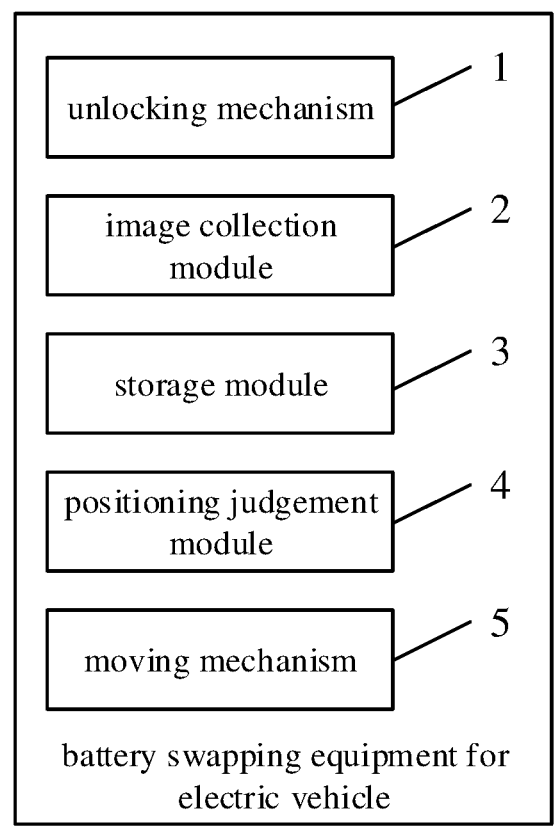
FIG. 1 is a module diagram of battery swapping equipment for an electric vehicle according to embodiment 1 of the present disclosure.

The present embodiment provides battery swapping equipment for an electric vehicle. FIG. 1 shows a module diagram of the present embodiment. Referring to FIG. 1, the battery swapping equipment for the present embodiment includes a control unit, an unlocking mechanism 1, an image collection module 2, a storage module 3, a positioning judgement module 4 and a moving mechanism 5.

Specifically, when the electric vehicle is parked in a parking area in a battery swapping station, the battery swapping station identifies a specific position of the electric vehicle in the parking area, generates a second moving instruction with the above specific position and sends it to the battery swapping equipment, and the moving mechanism 5 of the battery swapping equipment moves into the specific position of the electric vehicle according to the above second moving instruction, so as to achieve coarse positioning of the battery swapping equipment. Moreover, the control unit of the battery swapping equipment calls the image collection module 2 after the moving mechanism 5 moves in place.

Figure 2:
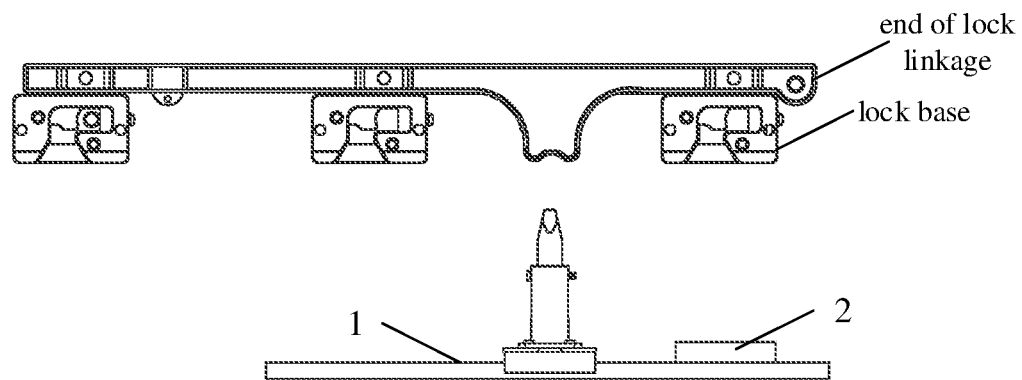
FIG. 2 is a schematic view of a position of an image collection module in battery swapping equipment for an electric vehicle according to embodiment 1 of the present disclosure.
Figure 3:
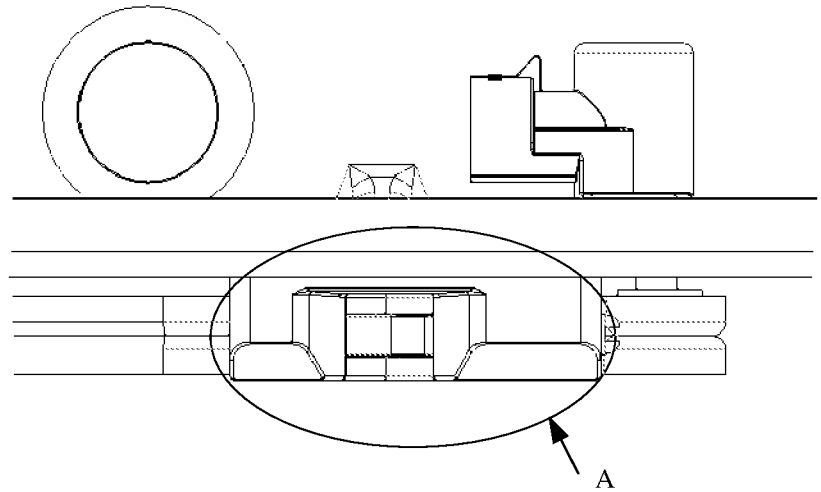
FIG. 3 is a schematic view of a first actual image in embodiment 1 of the present disclosure.

In the present embodiment, referring to FIG. 2, the image collection module 2 may be arranged in a position on the battery swapping equipment close to the unlocking mechanism 1. The unlocking mechanism 1 is configured to unlock a battery pack locked onto a fast swapping bracket of the electric vehicle. The fast swapping bracket includes a lock linkage and a lock base movably connected to the lock linkage. Specifically, in the present embodiment, the image collection module 2 is arranged in an opposite position to the lock base adjacent to an end of the lock linkage when the battery swapping equipment is in a battery swapping position, for collecting a first actual image including the lock base during an unlocking process. FIG. 3 shows a schematic view of the first actual image, and an area circled by area A is an image of the lock base collected by the image collection module 2.

The storage module 3 is configured to pre-store the battery swapping equipment to be located in the battery swapping position, and that is, when the battery swapping equipment is aligned with the fast swapping bracket, the image collection module 2 collects a first standard image including the lock base adjacent to the end of the lock linkage. It should be understood that when the position of the battery swapping equipment relative to the fast swapping bracket changes, the first actual image collected by the image collection module 2 also changes. In the present embodiment, whether the battery swapping equipment is aligned with the fast swapping bracket may be judged by comparing the first actual image and the first standard image.

In the present embodiment, the positioning judgement module 4 is configured to judge whether the battery swapping equipment is located in the battery swapping position according to the first actual image and the first standard image. Specifically, the positioning judgement module 4 judges whether outer contour positions of the lock base, adjacent to the end of the lock linkage, in the first actual image and the first standard image are the same. If the positions are the same, the battery swapping equipment is located in the battery swapping position aligned with the fast swapping bracket, and then the unlocking mechanism 1 unlocks the battery pack for battery swap; if the positions are not the same, that is, the battery swapping equipment is not located in the battery swapping position, and then the positioning judgement module 4 analyzes a positional difference of the outer contours of the above lock base in the first actual image and the first standard image, so as to generate a first moving instruction to instruct the battery swapping equipment moving to the battery swapping position and send it to the control unit of the battery swapping equipment. The control unit sends the above first moving instruction to the moving mechanism 5, and the moving mechanism 5 moves according to the first moving instruction, so as to achieve an exact positioning of the battery swapping equipment.

Further, in the present embodiment, after the moving mechanism 5 moves into a designated position according to the first moving instruction, the control unit of the battery swapping equipment may continue to call the image collection module 2 to collect the first actual image, until the positioning judgement module 4 judges that the battery swapping equipment is located in the battery swapping position.

Figure 4:
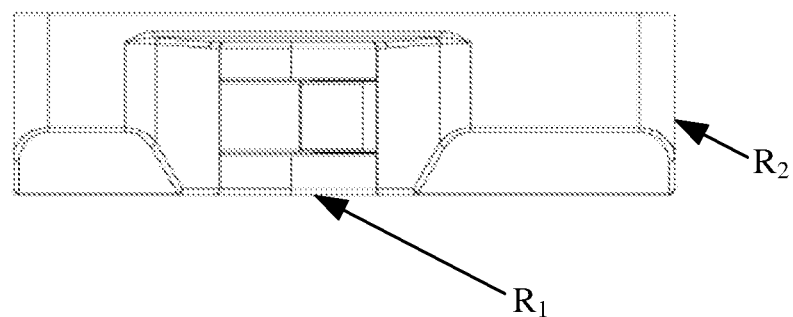
FIG. 4 is a partially enlarged view of the first actual image in FIG. 3.

Further, in the present embodiment, the above outer contours as a judgement object may include a first contour adjacent to the battery pack and a second contour intersecting with the first contour. For example, FIG. 4 shows an enlarged view of the lock base circled by area A, the outer contours may include a first contour R1 and a second contour R2.

Further, in the present embodiment, the fast swapping bracket may include two lock linkages. In order to further improve the positioning accuracy, the battery swapping equipment may correspondingly include two image collection modules respectively arranged in opposite positions to the lock bases adjacent to ends of the two lock linkages.

In the present embodiment, the battery swapping equipment is provided with the image collection module which may collect the actual image of the lock base as a positioning reference during positioning of the battery swapping equipment, and then based on the collected actual image of the lock base and the standard image of the lock base collected when the lock base is located in the battery swapping position, generate the moving instruction to control the moving mechanism of the battery swapping equipment to move, until the battery swapping equipment moves into the battery swapping position, thus achieving closed-loop control over positioning of the battery swapping equipment.

Embodiment 2

Figure 5:
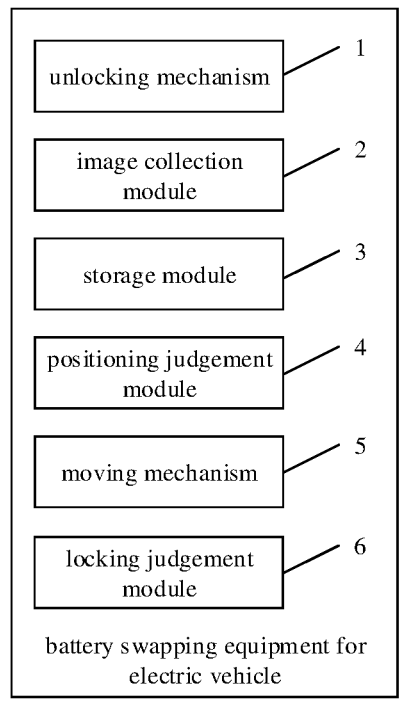
FIG. 5 is a module diagram of battery swapping equipment for an electric vehicle according to embodiment 2 of the present disclosure.

The present embodiment provides battery swapping equipment for the electric vehicle based on embodiment 1. FIG. 5 shows a module diagram of the present embodiment. Compared with embodiment 1, the battery swapping equipment for the present embodiment further includes a locking judgement module 6, for judging whether a battery pack is locked on a fast swapping bracket in place during a locking process.

Figure 6:
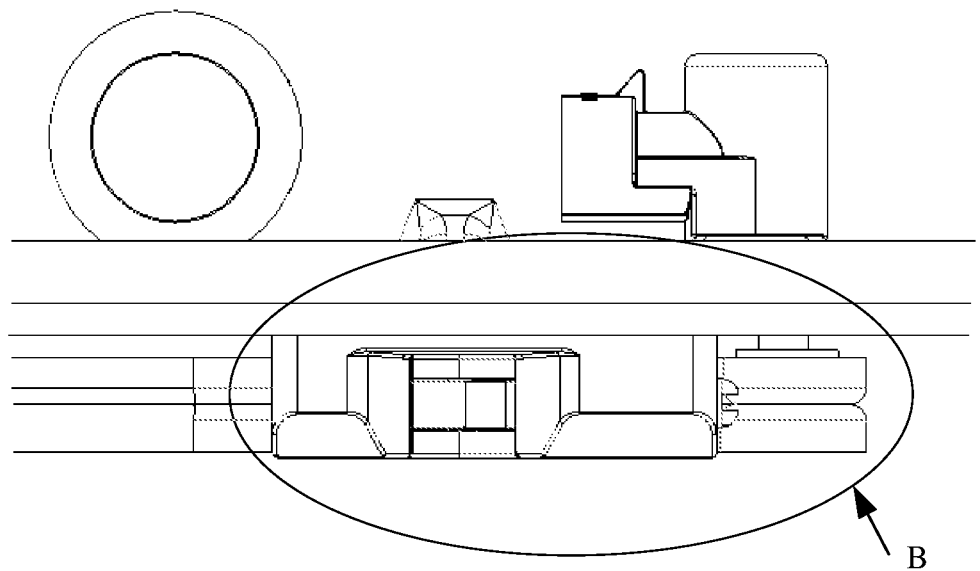
FIG. 6 is a schematic view of a second actual image in embodiment 2 of the present disclosure.

Specifically, in the present embodiment, an image collection module 2 is also configured to collect a second actual image including a lock base and a lock linkage during the locking process of the battery pack. FIG. 6 shows a schematic view of the second actual image, and an area circled by area B is an image of the lock base and the lock linkage collected by the image collection module 2. The storage module 3 is also configured to pre-store a second standard image including the lock base and the lock linkage, which is collected by the image collection module 2 when the battery pack is locked on the fast swapping bracket in place. In the second standard image, the lock base and the lock linkage are located in a standard locking position.

Figure 7:
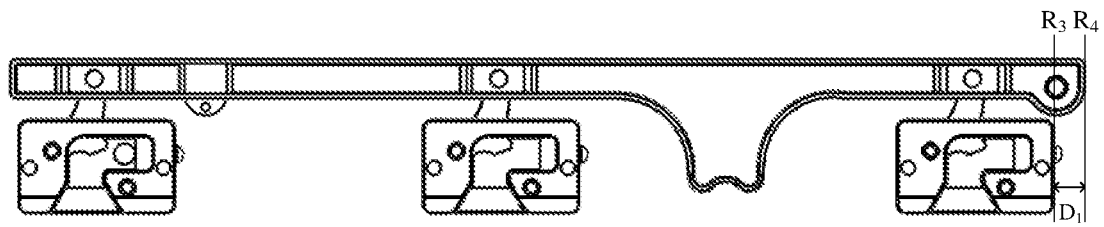
FIG. 7 is a schematic view of a relative position between a lock linkage and a lock base when the battery pack is not locked in place in embodiment 2 of the present disclosure.
Figure 8:
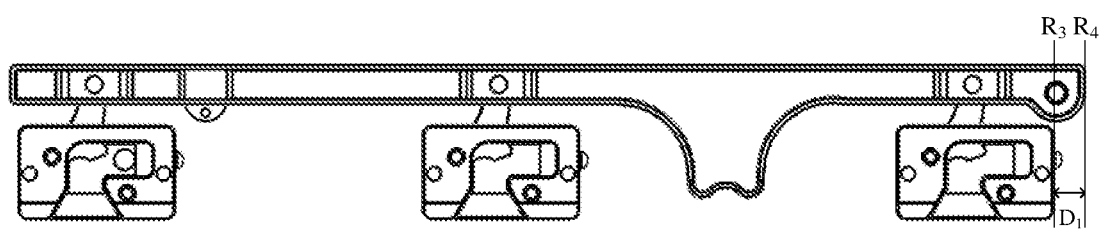
FIG. 8 is a schematic view of a relative position of a lock linkage and a lock base when the battery pack is locked in place in embodiment 2 of the present disclosure.

It should be understood that during the locking process of the battery pack, a relative position of the lock linkage and the lock base in the second actual image collected by the image collection module 2 changes. Specifically, the above change may be embodied in a relative distance between a plane where an end of the lock linkage is located and a side surface of the lock base closest to the end. For example, in FIG. 7, the battery pack is not locked in place, and there is a relative distance $D_1$ between a plane $R_4$ where the end of the lock linkage is located and a side surface $R_3$ of the lock base closest to the end. In FIG. 8, the battery pack is locked in place, and there is a relative distance $D_2$ between the plane $R_4$ where the end of the lock linkage is located and the side surface $R_3$ of the lock base closest to the end. In the present embodiment, by comparing the relative distance $D_1$ and the relative distance $D_2$ obtained from the second actual image and the second standard image, whether the battery pack is locked on the fast swapping bracket in place may be judged.

In the present embodiment, the relative distance $D_1$ may be calculated according to a resolution of the image collection module 2 and a size of the second actual image. Specifically, assuming that the resolution (X direction*Y direction) of the image collection module 2 is a*b and the size (X direction*Y direction) of the second actual image is c*d, the second actual image is divided into a*b pixels according to the above resolution. If the relative distance $D_1$ is in the X direction and has a length with $N_1$ pixels, then $D_1=N_1*c/a$. If the relative distance $D_1$ is in the Y direction and has a length with $N_2$ pixels, then $D_1=N_2*d/b$. The relative distance $D_2$ may be calculated according to the same method, which will not be repeated herein.

Figure 9:
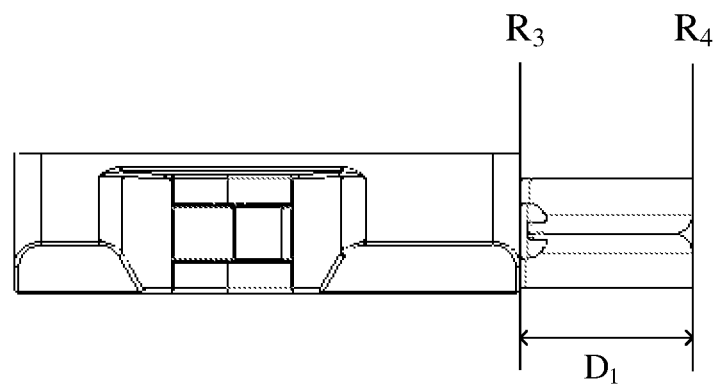
FIG. 9 is a partially enlarged view of the second actual image in FIG. 6.

In the present embodiment, the locking judgement module 6 is configured to judge whether the battery pack is locked on the fast swapping bracket in place according to the second actual image and the second standard image. FIG. 9 shows an enlarged view of the lock base and the lock linkage circled by area B. Specifically, the locking judgement module 6 judges whether a difference between the relative distance $D_1$ in the second actual image and the relative distance $D_2$ in the second standard image is within a preset range, so as to judge whether the battery pack is locked on the fast swapping bracket in place. If the difference between $D_1$ and $D_2$ is within the preset range, the locking judgement module 6 judges that the battery pack is locked on the fast swapping bracket in place.

Then, the locking judgement module 6 may send a locking confirmation signal indicating that the battery pack is locked on the fast swapping bracket in place to a control unit of the battery swapping equipment, and the control unit may send the above locking confirmation signal to the battery swapping station, such that the battery swapping station may confirm that the battery pack is locked normally, so as to further control a barrier gate system to lift a rod and release the electric vehicle which has finished the battery swap. If the difference between $D_1$ and $D_2$ is not within the preset range, the locking judgement module 6 judges that the battery pack is not locked on the fast swapping bracket in place, and the control unit of the battery swapping equipment may call the image collection module 2 to continue to collect the second actual image. The above preset range may be set according to the resolution of the image collection module 2 and the actual size of an image collected by the image collection module 2. For example, the above preset range may be [−0.5 mm, 0.5 mm] or [−1 mm, 1 mm].

Further, in the present embodiment, when a result judged by the locking judgement module 6 is yes, the image collection module 2 may also be called to collect a third actual image including the lock base and the lock linkage. In the third actual image, the lock base and the lock linkage are located in the actual locking position. Specifically, due to the existence of the above preset range, when the locking judgement module 6 judges that the battery pack is locked in place, the lock base and the lock linkage may not be accurately located in the standard locking position. However, the storage module 3 may be called to store and archive the third actual image for use, so as to prove that the battery pack is indeed locked in place during the battery swap. Further, the control unit of the battery swapping equipment may also delete last third actual image stored in the storage module 3 of the corresponding electric vehicle according to the above locking confirmation signal, and merely save the latest third actual image.

Based on the embodiment 1, the battery swapping equipment for the present embodiment may also judges whether the battery pack is locked on the fast swapping bracket in place according to the second standard image and the second actual image collected during the locking process, thus further improving the automation of the battery swapping equipment and then improving the efficiency of battery swap.

Embodiment 3

Figure 10:
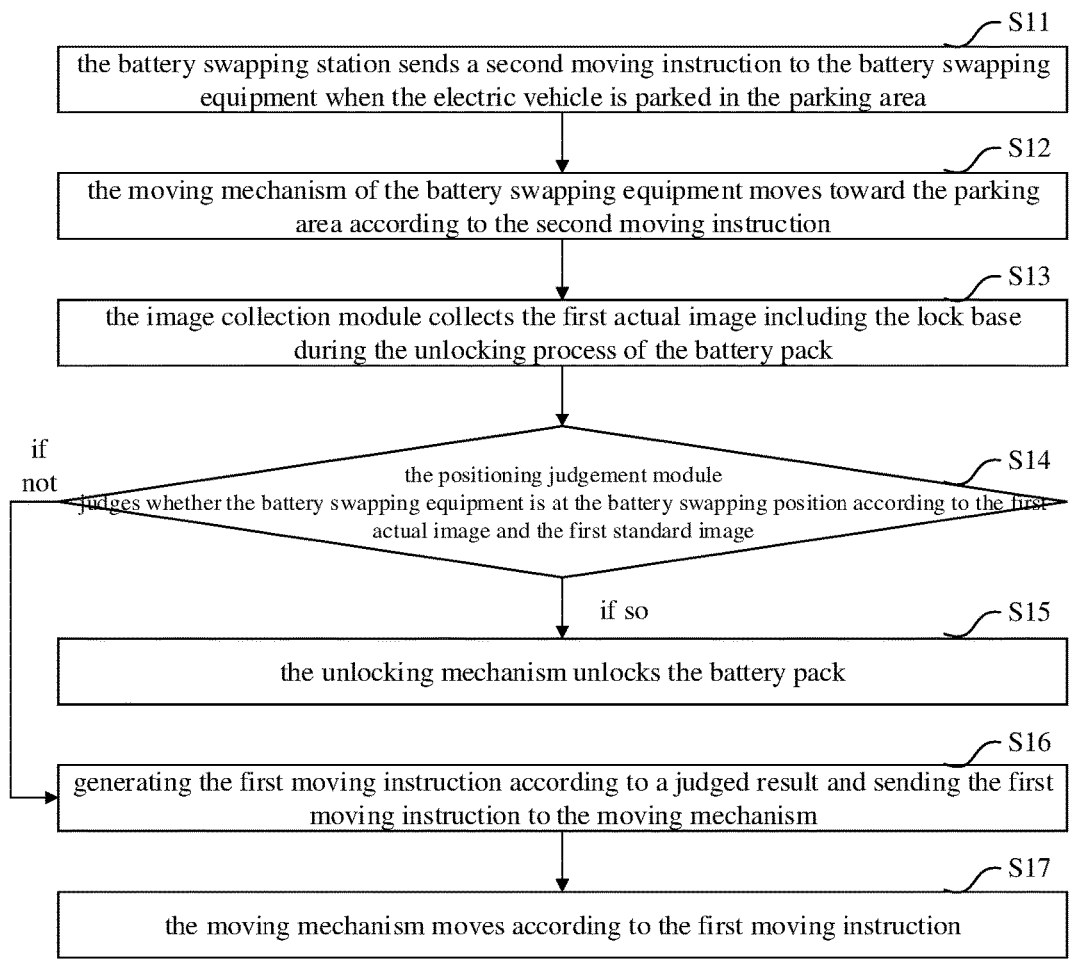
FIG. 10 is a flowchart of a positioning method for battery swapping equipment according to embodiment 3 of the present disclosure.

The present embodiment provides a positioning method for the battery swapping equipment, and the positioning method is achieved by the battery swapping equipment for the electric vehicle in the embodiment 1. FIG. 10 shows a flowchart of the present embodiment. Referring to FIG. 10, the positioning method of the present embodiment includes:

S11. the battery swapping station sends a second moving instruction to the battery swapping equipment when the electric vehicle is parked in the parking area.

Specifically, when the electric vehicle is parked in the parking area in the battery swapping station, the battery swapping station identifies the specific position of the electric vehicle in the parking area, generates the second moving instruction including the specific position and sends it to the battery swapping equipment.

S12. The moving mechanism of the battery swapping equipment moves toward the parking area according to the second moving instruction.

The moving mechanism of the battery swapping equipment moves toward the specific position of the electric vehicle according to the above second moving instruction, so as to achieve the coarse positioning of the battery swapping equipment. Moreover, the image collection module may be called after the moving mechanism moves in place.

S13. The image collection module collects the first actual image including the lock base during the unlocking process of the battery pack.

The first actual image is also shown in FIG. 3, in which the area circled by area A is the image of the lock base collected by the image collection module. It should be understood that when a position of the battery swapping equipment relative to the fast swapping bracket changes, the first actual image collected by the image collection module changes, too.

S14. The positioning judgement module judges whether the battery swapping equipment is at the battery swapping position according to the first actual image and the first standard image;

if so, proceed to step S15; if not, proceed to step S16;

S15. the unlocking mechanism unlocks the battery pack;

S16. generating the first moving instruction according to a judged result and sending the first moving instruction to the moving mechanism.

In the present embodiment, the first standard image is an image collected when the battery swapping equipment is located in the battery swapping position, that is, when the battery swapping equipment is aligned with the fast swapping bracket, and the image includes the lock base adjacent to the end of the lock linkage. In the present embodiment, by comparing the first actual image and the first standard image, whether the battery swapping equipment is aligned with the fast swapping bracket may be judged.

Specifically, step S14 may include: the positioning judgement module judges whether the outer contour positions of the lock base, adjacent to the end of the lock linkage, in the first actual image and the first standard image are the same. If the positions are the same, the battery swapping equipment is located in the battery swapping position aligned with the fast swapping bracket, and then, performing step S15: the unlocking mechanism unlocks the battery pack for battery swap; if the positions are not the same, that is, the battery swapping equipment is not located in the above battery swapping position, and then performing step S16: by analyzing the positional difference of the outer contours of the above lock base in the first actual image and the first standard image, generating the first moving instruction to instruct the battery swapping equipment to move into the battery swapping position and send it to the moving mechanism.

S17. the moving mechanism moves according to the first moving instruction.

In the present embodiment, the moving mechanism moves according to the first moving instruction, so as to achieve the exact positioning of the battery swapping equipment. Further, after step S17, step S13 may be continued to perform, until the result judged by the step S14 is yes, that is, the battery swapping equipment is located in the battery swapping position.

Further, in the present embodiment, the above outer contours as the judgement object may include a first contour adjacent to the battery pack and a second contour intersecting with the first contour. As also shown in FIG. 4, the outer contours may include the first contour $R_1$ and the second contour $R_2$.

Based on the battery swapping equipment according to the embodiment 1, the positioning method of the present embodiment may collect the actual image of the lock base as the positioning reference during the positioning of the battery swapping equipment, and then based on the collected actual image of the lock base and the standard image of the lock base collected when the lock base is located in the battery swapping position, generate the moving instruction to control the moving mechanism of the battery swapping equipment to move, until the battery swapping equipment moves into the battery swapping position, thus achieving the closed-loop control over the positioning of the battery swapping equipment.

Embodiment 4

Figure 11:
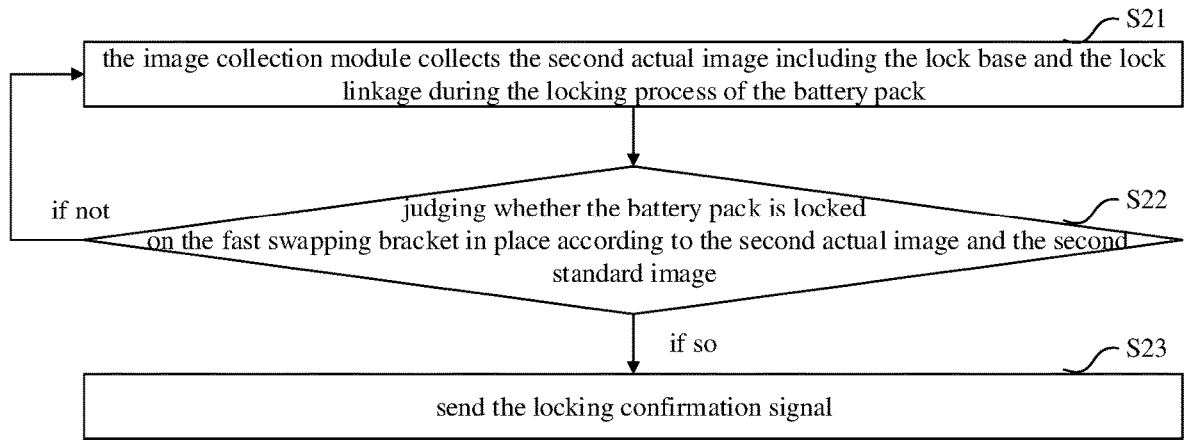
FIG. 11 is a partial flowchart of a positioning method for battery swapping equipment according to embodiment 4 of the present disclosure.

The present embodiment provides a positioning method for battery swapping equipment based on the embodiment 3. FIG. 11 shows a partial flowchart of the present embodiment. Compared with the embodiment 3, the storage module of the battery swapping equipment in the present embodiment also pre-stores the second standard image including the lock base and the lock linkage, which is collected by the image collection module when the battery pack is locked on the fast swapping bracket in place. In the second standard image, the lock base and the lock linkage are located in the standard locking position. The positioning method of the present embodiment also includes following steps after step S15:

S21. the image collection module collects the second actual image including the lock base and the lock linkage during the locking process of the battery pack.

Specifically, in the present embodiment, the image collection module is also configured to collect the second actual image including the lock base and the lock linkage during the locking process of the battery pack. The second actual image is also shown in FIG. 6, in which the area circled by area B is the image of the lock base and the lock linkage collected by the image collection module.

It should be understood that during the locking process of the battery pack, the relative position of the lock linkage and the lock base in the second actual image collected by the image collection module changes. Specifically, the above change may be embodied in the relative distance between the plane where the end of the lock linkage is located and the side surface of the lock base closest to the end. For example, in FIG. 7, the battery pack is not locked in place, and there is the relative distance $D_1$ between the plane $R_4$ where the end of the lock linkage is located and the side surface $R_3$ of the lock base closest to the end. In FIG. 8, the battery pack is locked in place, and there is the relative distance $D_2$ between the plane $R_4$ where the end of the lock linkage is located and the side surface $R_3$ of the lock base closest to the end. In the present embodiment, by comparing the relative distance $D_1$ and the relative distance $D_2$ obtained from the second actual image and the second standard image, whether the battery pack is locked on the fast swapping bracket in place may be judged.

S22. judging whether the battery pack is locked on the fast swapping bracket in place according to the second actual image and the second standard image;

if so, proceeding to step S23; if not, continuing to perform step S21;

S23. sending the locking confirmation signal.

The enlarged view of the lock base and the lock linkage circled by area B is also shown in FIG. 9. Specifically, step S22 may include: judging whether the difference between the relative distance $D_1$ in the second actual image and the relative distance $D_2$ in the second standard image is within the preset range, so as to judge whether the battery pack is locked on the fast swapping bracket in place. If the difference between $D_1$ and $D_2$ is within the preset range, the battery pack is locked on the fast swapping bracket in place, and then performing step 23: sending the locking confirmation signal indicating that the battery pack is locked on the fast swapping bracket in place to the battery swapping station, such that the battery swapping station may confirm that the battery pack is locked normally, and then, controlling the barrier gate system to lift the rod and release the electric vehicle which has finished the battery swap. If the difference between $D_1$ and $D_2$ is not within the preset range, continuing to perform step S22: collecting the second actual image. The above preset range may be set according to the resolution of the image collection module 2 and the actual size of the collected image. For example, the above preset range may be [−0.5 mm, 0.5 mm] or [−1 mm, 1 mm].

Further, in the present embodiment, when the result judged by step S22 is yes, the positioning method of the present embodiment may also include:

the image collection module collects the third actual image including the lock base and the lock linkage;

the storage module stores the third actual image.

Specifically, in the third actual image, the lock base and the lock linkage are located in the actual locking position. Due to the existence of the above preset range, when the battery pack is judged to be locked in place, the lock base and the lock linkage may not be accurately located in the standard locking position. However, the third actual image may be stored and archived for use, so as to prove that the battery pack is locked in place during the battery swap. Further, the battery swapping equipment may also delete the last third actual image of the electric vehicle according to the above locking confirmation signal, and merely save the latest third actual image.

Based on the embodiment 3, the positioning method of the present embodiment may also judge whether the battery pack is locked on the fast swapping bracket in place according to the second standard image and the second actual image collected during the locking process, thus further improving the automation of the positioning method for the battery swapping equipment, and then improving the efficiency of the battery swap.

Although the specific embodiments of the present disclosure are described above, those skilled in the art should understand that these are only examples, various changes or modifications can be made to these embodiments without departing from the principle and essence of the present disclosure, and the changes or modifications fall into the protection scope of the present disclosure.

What is claimed is:

1. Battery swapping equipment for an electric vehicle, comprising:
    an unlocking mechanism configured to unlock a battery pack locked onto a fast swapping bracket of the electric vehicle, the fast swapping bracket comprising a lock base;
    an image collection module configured to collect a first actual image comprising the lock base during an unlocking process of the battery pack;
    a storage module configured to store a first standard image collected by the image collection module when the battery swapping equipment is located in a battery swapping position, the first standard image comprising the lock base;
    a moving mechanism; and
    a positioning judgement module configured to judge whether the battery swapping equipment is located in the battery swapping position according to the first actual image and the first standard image; if not, generating a first moving instruction according to a judged result and sending the first moving instruction to the moving mechanism,
    wherein the moving mechanism is configured to move according to the first moving instruction;
    wherein the fast swapping bracket further comprises a lock linkage movably connected to the lock base, and the battery swapping equipment further comprises a locking judgement module;
    the image collection module is further configured to collect a second actual image comprising the lock base and the lock linkage during a locking process of the battery pack;
    the storage module is further configured to store a second standard image comprising the lock base and the lock linkage and collected by the image collection module when the battery pack is locked on the fast swapping bracket in place, the lock base and the lock linkage are located in a standard locking position in the second standard image; and
    the locking judgement module is configured to judge whether the battery pack is locked on the fast swapping bracket in place according to the second actual image and the second standard image and if so, send a locking confirmation signal.

2. The battery swapping equipment for the electric vehicle according to claim 1, wherein the battery swapping equipment is configured to receive a second moving instruction from a battery swapping station when the electric vehicle is parked in a parking area, and the moving mechanism of the battery swapping equipment is movable toward the parking area according to the second moving instruction.

3. The battery swapping equipment for the electric vehicle according to claim 1, wherein the positioning judgement module is specifically configured to judge whether outer contour positions of the lock base in the first actual image and the first standard image are the same;

if so, the battery swapping equipment is located in the battery swapping position;

if not, the battery swapping equipment is not located in the battery swapping position.

4. The battery swapping equipment for the electric vehicle according to claim 3, wherein in the first actual image and the first standard image, the outer contours of the lock base comprise a first contour adjacent to the battery pack and a second contour intersecting with the first contour.

5. The battery swapping equipment for the electric vehicle according to claim 1, wherein the locking judgement module is specifically configured to:

judge whether a difference between a relative distance in the second actual image and a relative distance in the second standard image is within a preset range, wherein the relative distance is a distance between a plane where an end of the lock linkage is located and a side surface of the lock base closest to the end; and if so, judge that the battery pack is locked on the fast swapping bracket in place.

6. The battery swapping equipment for the electric vehicle according to claim 5, wherein the preset range is set according to resolution of the image collection module and actual size of an image collected by the image collection module.

7. The battery swapping equipment for the electric vehicle according to claim 1, wherein the image collection module is arranged in an opposite position to the lock base adjacent to the end of the lock linkage.

8. The battery swapping equipment for the electric vehicle according to claim 1, wherein the image collection module is configured to collect a third actual image comprising the lock base and the lock linkage when a result judged by the locking judgement module is yes, the storage module is configured to store the third actual image, and in the third actual image, the lock base and the lock linkage are located in an actual locking position.

9. A positioning method for battery swapping equipment, the battery swapping equipment comprising an unlocking mechanism and a moving mechanism, the unlocking mechanism being configured to unlock a battery pack locked onto a fast swapping bracket of an electric vehicle, and the fast swapping bracket comprising a lock base, wherein the positioning method comprises:

collecting a first actual image comprising the lock base during an unlocking process of the battery pack, and storing a first standard image collected when the battery swapping equipment is located in a battery swapping position, the first standard image comprising the lock base;

judging whether the battery swapping equipment is located in the battery swapping position according to the first actual image and the first standard image;

if not, generating a first moving instruction according to a judged result and sending the first moving instruction to the moving mechanism; and the moving mechanism moving according to the first moving instruction, wherein the fast swapping bracket further comprises a lock linkage movably connected to the lock base;

wherein the positioning method further comprises:

storing a second standard image comprising the lock base and the lock linkage and collected when the battery pack is locked on the fast swapping bracket in place, and the lock base and the lock linkage are located in a standard locking position in the second standard image;

wherein the positioning method further comprises:

collecting a second actual image comprising the lock base and the lock linkage during the locking process of the battery pack; and judging whether the battery pack is locked on the fast swapping bracket in place according to the second actual image and the second standard image and, if so, sending a locking confirmation signal.

10. The positioning method for the battery swapping equipment according to claim 9, wherein before collecting the first actual image comprising the lock base by the image collection module, the positioning method further comprises:

a battery swapping station sending a second moving instruction to the battery swapping equipment when the electric vehicle is parked in a parking area;

the moving mechanism of the battery swapping equipment moving toward the parking area according to the second moving instruction.

11. The positioning method for the battery swapping equipment according to claim 9, wherein the judging whether the battery swapping equipment is located in the battery swapping position comprises:

judging whether outer contour positions of the lock base in the first actual image and the first standard image are the same;

if so, the battery swapping equipment being located in the battery swapping position;

if not, the battery swapping equipment being not located in the battery swapping position.

12. The positioning method for the battery swapping equipment according to claim 11, wherein in the first actual image and the first standard image, the outer contours of the lock base comprises a first contour adjacent to the battery pack, and a second contour intersecting with the first contour.

13. The positioning method for the battery swapping equipment according to claim 9, wherein the judging whether the battery pack is locked on the fast swapping bracket in place according to the second actual image and the second standard image comprises:

judging whether a difference between a relative distance in the second actual image and a relative distance in the second standard image is within a preset range, wherein the relative distance is a distance between a plane where an end of the lock linkage is located and a side surface of the lock base closest to the end;

if so, the battery pack being locked on the fast swapping bracket in place.

14. The positioning method for the battery swapping equipment according to claim 9 wherein the positioning method further comprises, when judging whether the battery pack is locked on the fast swapping bracket in place:

collecting a third actual image comprising the lock base and the lock linkage;

storing the third actual image;

in the third actual image, the lock base and the lock linkage being located in an actual locking position.

15. The battery swapping equipment for the electric vehicle according to claim 6, wherein the preset range is from −0.5 mm to 0.5 mm or from −1 mm to 1 mm.

16. The battery swapping equipment for the electric vehicle according to claim 7, wherein the fast swapping bracket comprises two lock linkages, the battery swapping equipment comprises two image collection modules, and the two image collection modules are respectively arranged in opposite positions to lock bases adjacent to the ends of the two lock linkages.

* * * * *